(12) United States Patent
Sylard

(10) Patent No.: US 8,439,059 B2
(45) Date of Patent: May 14, 2013

(54) DEVICE WITH DIRECT CONTROL, IN PARTICULAR PROPORTIONAL AND/OR RECTILINEAR CONTROL, FOR FLUID LOADING AND/OR UNLOADING SYSTEM

(75) Inventor: Nicolas Sylard, Auxerre (FR)

(73) Assignee: FMC Technologies SA, Sens (FR)

( * ) Notice: Subject to any disclaimer, the term of this patent is extended or adjusted under 35 U.S.C. 154(b) by 266 days.

(21) Appl. No.: 12/735,687

(22) PCT Filed: Jun. 23, 2008

(86) PCT No.: PCT/IB2008/002628
§ 371 (c)(1),
(2), (4) Date: Aug. 5, 2010

(87) PCT Pub. No.: WO2009/098540
PCT Pub. Date: Aug. 13, 2009

(65) Prior Publication Data
US 2010/0313977 A1    Dec. 16, 2010

(30) Foreign Application Priority Data

Feb. 8, 2008 (FR) .................................. 08 50820

(51) Int. Cl.
*B67D 9/02* (2010.01)
*B63B 27/24* (2006.01)
(52) U.S. Cl.
USPC ............... 137/1; 137/615; 137/556; 141/387
(58) Field of Classification Search ............... 137/615, 137/553, 554, 556, 1; 141/387; 251/129.04
See application file for complete search history.

(56) References Cited

U.S. PATENT DOCUMENTS

| 4,190,080 A | 2/1980 | Le Devehat |
| 4,205,308 A * | 5/1980 | Haley et al. .................... 141/387 |
| 4,402,350 A * | 9/1983 | Ehret et al. .................... 137/554 |
| 4,408,943 A * | 10/1983 | McTamaney et al. ........ 137/554 |
| 6,382,269 B1 | 5/2002 | Tatsuno |
| 8,176,938 B2 * | 5/2012 | Queau et al. .................. 137/615 |

FOREIGN PATENT DOCUMENTS

| CN | 1677382 A | 10/2005 |
| FR | 2 384 194 A1 | 10/1978 |
| JP | 7-285600 A | 10/1995 |

* cited by examiner

*Primary Examiner* — Kevin Lee

(57) ABSTRACT

The invention concerns a control device for the movement and positioning of a coupling for a marine loading system having at least one fluid transfer line with a first line end fixed to a base and a moveable second line end provided with a coupling adapted for connection to a target duct, the marine loading system further having a plurality of mechanical connections such that the coupling has at least three degrees of freedom relative to the base. The device includes at least three proportional control actuators, each for proportionally controlling the movement of the system in a degree of freedom, a position sensor for tracking each degree of freedom, an operator input interface for inputting commands to move the coupling, and a calculator for calculating the instantaneous position of the coupling from the information provided by the sensors and for calculating, from movement command inputs of the input interface, simultaneous control instructions to give to each of the actuators such that their combined movements result in a movement of the coupling corresponding to the movement command provided by the operator at the input interface.

10 Claims, 3 Drawing Sheets

DEVICE WITH DIRECT CONTROL, IN PARTICULAR PROPORTIONAL AND/OR RECTILINEAR CONTROL, FOR FLUID LOADING AND/OR UNLOADING SYSTEM

BACKGROUND OF THE INVENTION

The present invention generally relates to systems for loading and/or unloading fluids for ships, commonly referred to as marine loading systems. These systems are used to transfer a liquid or gaseous product between a ship and a quay or between two ships.

More particularly, the present invention relates to the devices for controlling movement and positioning of such loading and/or unloading systems.

Generally, marine loading systems have a fluid transfer line end that is fixed to a base and connected to a tank of fluid to be transferred, and an opposite line end that is moveable and provided with a coupling adapted for connecting to a target duct, itself connected to a fluid tank.

Two families of fluid loading systems for ships are known, which are distinguished by their structure: systems for transfer by rigid pipes and systems for transfer by flexible pipes.

In the family of systems for transfer by rigid pipes, loading arm systems and pantograph systems can be distinguished.

The loading arm is an articulated tubing arrangement, having a base, connected to fluid tank, on which there is mounted a first pipe, designated inner pipe, via a portion of tube with a 90° bend enabling rotation of one of its ends about a vertical axis, and the other end about a horizontal axis. At the opposite end of the inner pipe, a second pipe, designated outer pipe, is rotatably mounted about a horizontal axis. A coupling is mounted at the end of the outer pipe.

Each of the three rotations is controlled by a jack or hydraulic motor with an on/off control. The operator has a command interface enabling him to control each of the movements independently.

The pantograph systems, like the loading arms, have a base connected to a tank. A crane is rotatably mounted on that base. The crane has a boom carrying a pipe for the fluid. At the end of the boom there is mounted a pantograph composed of articulated pipes for the fluid, and enabling a coupling to be moved that is mounted at the free end of the pantograph. The inclination of the pantograph is controlled by a rotation at the end of the boom. The movement of the pantograph is controlled by hydraulic motors and by a jack for the rotation on the base.

Lastly, the flexible piping systems generally have a line in which is conveyed the fluid product and a mechanical system enabling the line to be maneuvered. There are several types of maneuvering systems, but in all cases they include a manipulating crane or structure which supports the coupling for connecting the flexible piping.

In practice, in most of the systems, the coupling is freely articulated at its end with regard to three rotations, so as to be able to be manipulated manually and precisely by an operator when the coupling is presented to the target duct, for the connection.

These two families of loading devices have structural differences, but their control systems are designed according to the same general principle of operation. It is noted that, in all cases, the coupling has at least three degrees of freedom relative to the base bearing the fixed end of the duct, and that the movements in each of these degrees of freedom are independently controlled by actuators.

Each actuator is separately controlled by an independent control of on/off type. The operator can act independently on each of the controls to control a particular member of the loading system. The combined action on the group of actuators enables the coupling to be positioned at a desired point in space.

In general, the actuators used are hydraulic, for example a hydraulic motor or jack, but the use of electric actuators is also known, for example electric motors, or pneumatic actuators. In all cases, the actuators equipping marine loading systems are controlled by on/off control, with a constant speed of movement, and in certain cases, with the possibility of setting two speeds of movement at will.

In practice, these control devices are delicate to implement, in that the operator must know the kinematics of the marine loading system perfectly and simultaneously combine the movement of each of the actuators independently so as to obtain, by summing all the movements, a combined movement of the coupling corresponding to the movement he desires to give to it. As the movements are generated by actuators with on/off control at a fixed speed, it is difficult or even impossible for the operator to generate movement of the coupling that is rectilinear and/or at constant speed. More generally, it is difficult for the operator to precisely master the movement of the coupling, which increases the risks of the coupling striking against obstacles or against the target duct. This may damage the seals of the coupling.

SUMMARY OF THE INVENTION

On the basis of these observations, the invention aims to facilitate the operation of controlling movement of the coupling for the operator by making it more intuitive, so as to make it possible to achieve the connection of the coupling in unfavorable sea conditions, and more generally to facilitate the connection and make it more rapid in all cases, while reducing the risk of striking of the coupling, which may in particular damage the seals.

To that end the invention provides a control device for the movement and positioning of a coupling for a marine loading system, said marine loading system comprising at least one fluid transfer line having a line end fixed to a base, and a moveable line end provided with a coupling adapted for connection to a target duct, the system further having a plurality of mechanical connections such that the coupling has at least three degrees of freedom relative to the base, the device being characterized in that it comprises at least three proportional control actuators each for proportionally controlling the movement of the system in a degree of freedom, a position sensor of the system tracking each degree of freedom, an operator input interface for inputting commands to move the coupling, and a calculator for calculating the instantaneous position of the coupling from the information provided by the sensors, and for calculating, from movement command inputs of the input interface, simultaneous control instructions to give to each of the actuators such that their combined movements result in a movement of the coupling corresponding to the movement command provided by the operator at the input interface.

Advantageously, this device enables the operator to control the movement of the coupling intuitively, without having to compensate for its movement by acting on several controls simultaneously. In other words, the device according to the invention makes it possible for the user to control the movement of the coupling directly, without having to worry about the kinematics of the loading system. With the device according to the invention, the operator is dispensed with having to combine the movements of the kinematics by acting on several controls at the same time, since these operations are carried out by the calculator. The operator may thus directly control the movement of the coupling, and may thus in particular achieve movement of the coupling that is rectilinear, and/or at constant speed.

Advantageously, the invention adapts to any type of marine loading system, to the systems for transfer by rigid pipes as well as to the systems for transfer by flexible pipes.

According to an advantageous feature of the invention, the command input interface has at least one proportional control such that acting on said proportional control with higher or lower magnitude gives at least one proportional control instruction that is respectively of higher or lower magnitude for at least one of the actuators, resulting in a movement of the coupling at a speed of movement that is respectively higher or lower.

Advantageously, each of the controls is of proportional type, which means in practice that the amplitude of movement at a control results in a higher or lower speed at the actuators.

According to advantageous features, which may be combined:
- at least one of the position sensors of the system is an angle sensor;
- at least one of the proportional control actuators is a hydraulic actuator cooperating with a proportional control valve;
- at least one of the proportional control actuators is a proportional control electric motor.
- the communication between the command input interface and the calculator is wireless, the input interface being connected to a transmitter having wireless communication with a receiver connected to the calculator;
- the command input interface has at least one manipulation member, designed so as to supply movement commands to the coupling in at least two of the three degrees of freedom;
- several marine loading systems are connected to the calculator, and a selector is provided at the command interface to selectively control one of the loading systems connected to the calculator.

According to another aspect, the invention provides an automaton for a device as described above, comprising inputs for receiving a position signal output by a position sensor of the system in each degree of freedom and for receiving a control signal from an operator input interface for inputting commands to move the coupling, and is configured to calculate, on the basis of the inputs, simultaneous control instructions to give to each of the actuators such that their combined movements result in a movement of the coupling corresponding to the movement command provided by the operator to the input interface, and said automaton comprises outputs to which are connected the actuators, and each automaton applies the calculated control instructions intended for the actuators to the outputs.

According to another aspect, the invention provides a calculating method for an automaton as described above, comprising the following calculating steps:
- on the basis of the information provided by the position sensors, calculating the spatial coordinates of the coupling position relative to a point of origin defined in advance,
- on the basis of the command inputs by the operator made at the command interface, calculating the speeds of movement in the at least three degrees of freedom of the loading system,
- on the basis of the spatial coordinates of the position of the coupling and of the desired speeds, calculating output instructions to apply to each of the actuators to control the movement of the loading system according to the command inputs made at the command interface.

BRIEF DESCRIPTION OF THE DRAWINGS

The explanation of the invention will now be continued with the detailed description of an embodiment, given below by way of non-limiting example, with reference to the accompanying drawings. In the drawings.

DETAILED DESCRIPTION OF THE INVENTION

Figure 1:
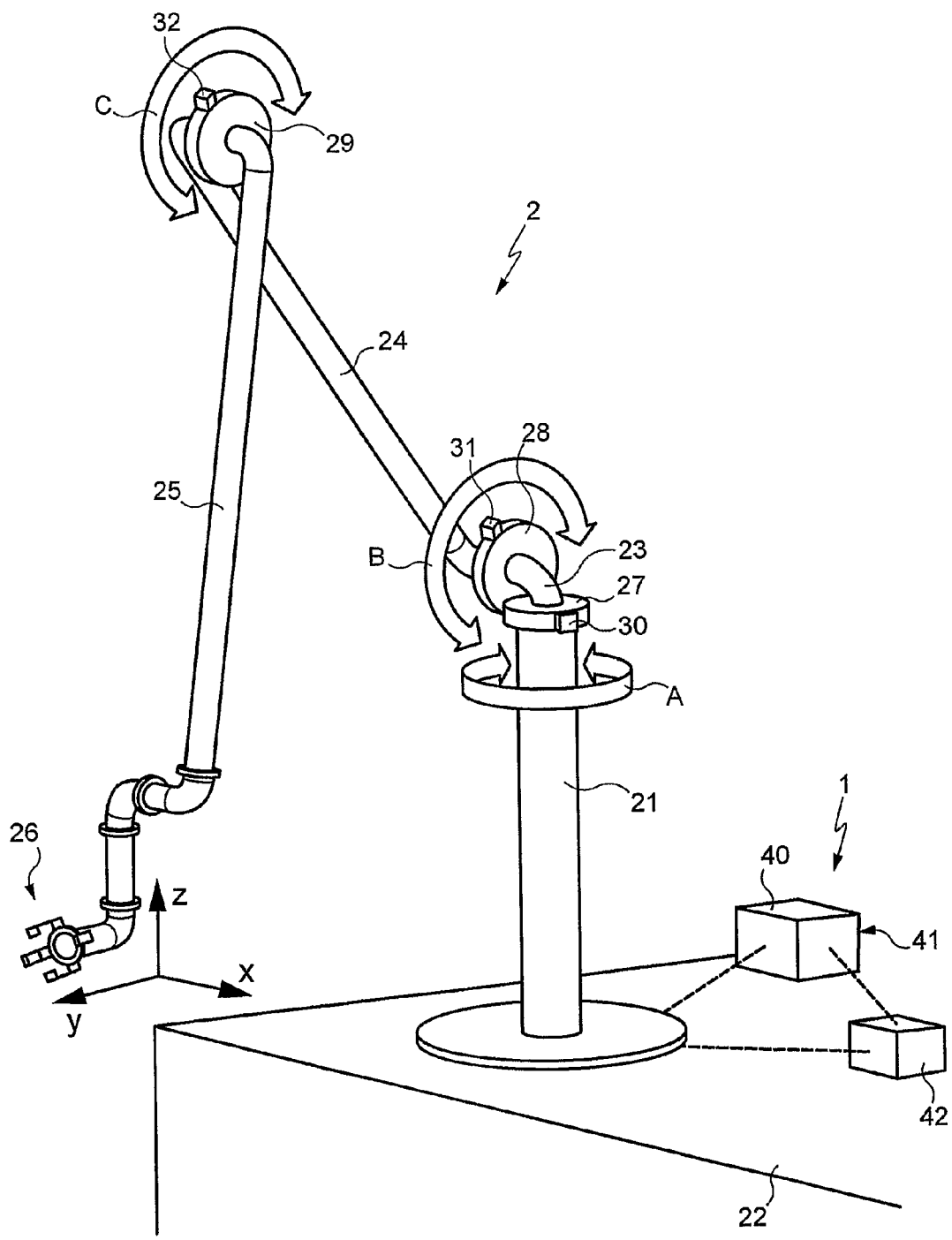
FIG. 1 is a diagrammatic view in perspective of a loading arm equipped with a control device according to the invention.

FIG. 1 is a very diagrammatic representation of a loading arm 2 equipped with a control device 1 according to the invention. The representation of the loading arm here is very simplified, and it should be recalled in this connection that the control device according to the invention may be adapted to any type of marine loading system, in particular to the loading systems described above.

The loading arm of FIG. 1 has a base 21 connected to a fluid tank which is located below the surface 22 on which the base is fixed, and which may for example be a quay or the deck of a ship. At the apex of the base there is rotatably articulated a bent tube 23, on which is articulated in turn a first tube referred to as inner tube 24 which is articulated at its opposite end with a second tube referred to as outer tube 25. The end of the outer tube carries a coupling 26 adapted to be connected to a target duct (not shown), for example on a ship. In a manner known per se, the coupling has three degrees of freedom in rotation relative to the end of the outer tube. These three rotations are free, such that an operator may freely adjust the angle of the coupling during the final phase of approach for the connection of the coupling to the target pipe.

Generally, this type of loading arm is known per se, and will not be described in more detail here. It will moreover be noted that the control device according to the invention adapts to all the marine loading systems, and that the adaptation of the control device according to the invention to any other type of loading system, in particular one of the systems described above, is within the capability of the person skilled in the art.

In the device according to the invention as represented diagrammatically in FIG. 1, actuators 27, 28, 29 are provided at each of the three articulations of the loading arm (symbolized by the double arrows A, B, C). More specifically, a first actuator 27 is provided between the apex of the base 21 and the bent tube 23, to pivot the latter horizontally relative to the base, a second actuator 28 is provided between the end of the bent tube 23 and the inner tube 24 so as to pivot the inner tube vertically, and a third actuator 29 is provided between the inner tube 24 and the outer tube 25 to make the latter pivot vertically.

The three actuators 27, 28, 29 are hydraulic jacks here represented very diagrammatically in FIG. 1. In a variant not illustrated, one or more of the hydraulic jacks are replaced by hydraulic motors. According to another variant not illustrated, the actuators are electric or pneumatic motors.

Figure 2:
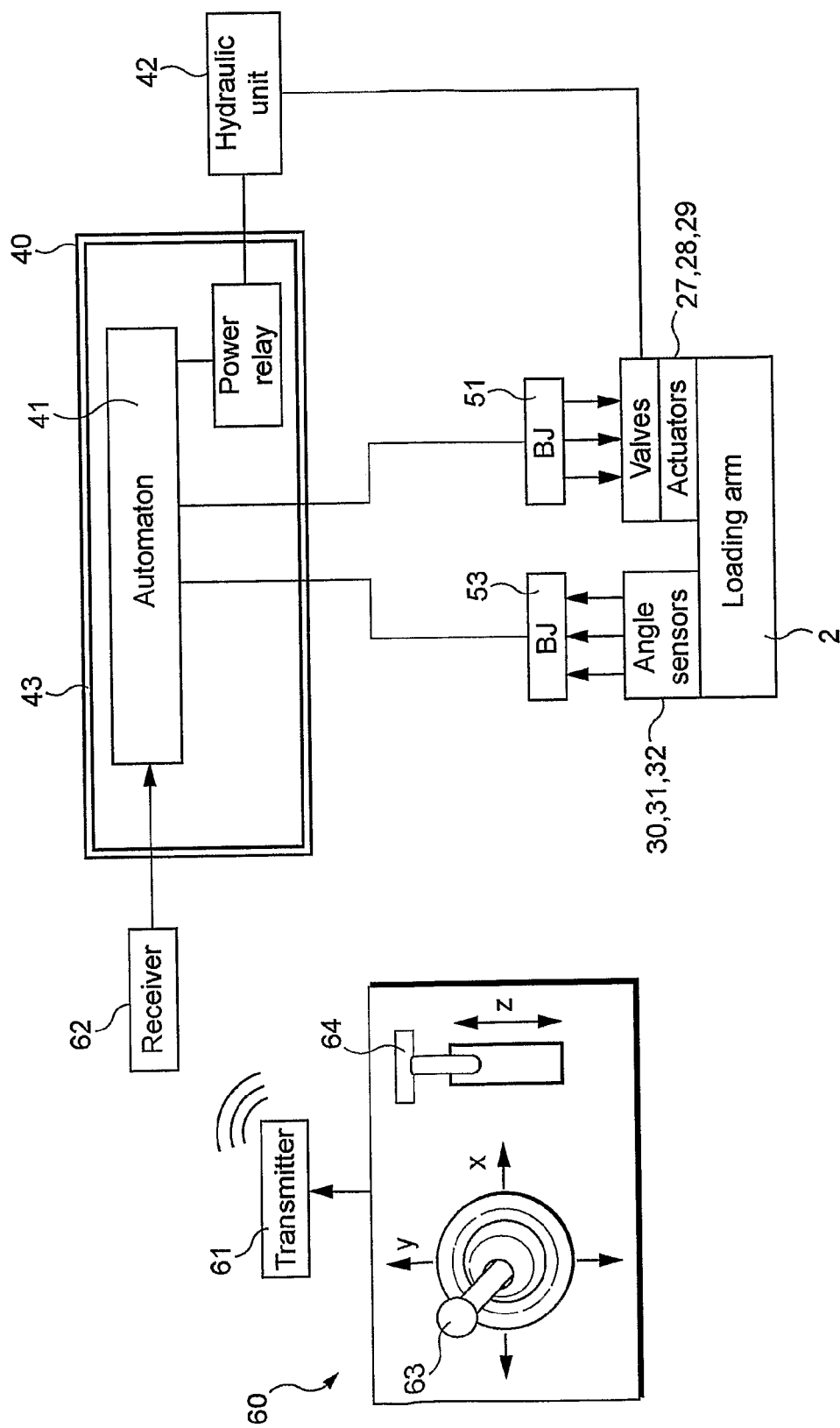
FIG. 2 is an operating synoptic diagram of the operation of a device according to the invention, in particular according to FIG. 1.

Angle sensors 30, 31, 32 are provided at the articulations between each member of the loading arm. An angle sensor 30 is provided between the base 21 and the bent tube 23, an angle sensor 31 is provided between the bent tube 23 and the inner tube 24 and an angle sensor 32 is provided between the inner tube 24 and the outer tube 25. The angle sensors are advantageously disposed on the actuators themselves, as can be seen in FIG. 2.

According to an advantageous variant not represented, the angle sensors 31 and 32 are replaced by pendulum sensors respectively disposed on the inner and outer arms, to give their angle of inclination relative to the vertical given by the pendulum.

Each of the sensors is connected to the same control calculator 41 which in fact is an automaton disposed in an electrical control cabinet 40.

A hydraulic power unit 42 is provided to supply the actuators with the hydraulic energy necessary for their operation. It is controlled by the automaton.

FIG. 2 is a block diagram giving the principle of general operation of a device according to the invention, and more particularly of the device as represented in FIG. 1.

As can be seen in the block diagram, the loading arm is equipped with actuators 27, 28, 29, controlled by proportional control valves. The hydraulic power unit 42 provides the actuators with the hydraulic energy necessary for their operation, via said proportional control valves. A junction box (BJ) 51 is provided to gather all the control signals destined for the valves.

The actuator arm is furthermore equipped with angle sensors 30, 31, 32 respectively connected to a junction box (BJ) 53 so as to gather the signals output by the angle sensors.

The electrical control cabinet possesses an explosion-resistant envelope 43, which makes it possible to protect the content of the cabinet from possible accidental explosions which could occur nearby, for example during the transfer of hydrocarbons via the loading system.

The automaton furthermore controls a power relay to control the starting and stopping of the hydraulic power unit. The hydraulic power unit comprises a pump (not represented) adapted to pump a hydraulic fluid to actuate the hydraulic motors or jacks.

A user input interface 60 enables the loading system to be controlled. In the embodiment illustrated, this interface is a remote control unit provided with a transmitter 61 to communicate with a receiver 62 connected to the automaton in the electrical control cabinet. The transmitter and receiver communicate by radio waves. As a variant, the transmitter and the receiver communicate by optical waves, for example infrared waves.

According to a variant not illustrated the input interface is connected by a cable with the automaton to communicate with it.

In the remote control unit that can be seen in FIG. 2, the operator has a control for moving the loading arm along the "x" axis, and a control for moving it along the "y" axis, which axes can be seen in FIG. 1. The controls for movement along the "x" and "y" axes are combined into the same manipulation member in the form of a control lever 63. A separate control lever 64 enables the arm to be moved along the "z" axis. Each of control levers is of proportional type, which means in practice that the amplitude of the movement of a control lever results in wider or narrower opening of the proportional control valves and, consequently, in a higher or lower speed at the actuators.

In a variant not illustrated, the controls for movement along the "x" and "z" axes are grouped together on the same control lever. A separate control lever enables the arm to be moved along the "y" axis. It will be noted that other combinations of grouping together of the controls are within the capability of the person skilled in the art.

In another variant not illustrated, the controls for movement along the "x", "y" and "z" axes are grouped together on the same manipulation member.

In a variant not illustrated, several arms are controlled by the same automaton. A selector provided on the remote control unit enables a plurality of loading arms, linked to the same automaton, to be controlled using the same principle and with the same control levers.

Figure 3:
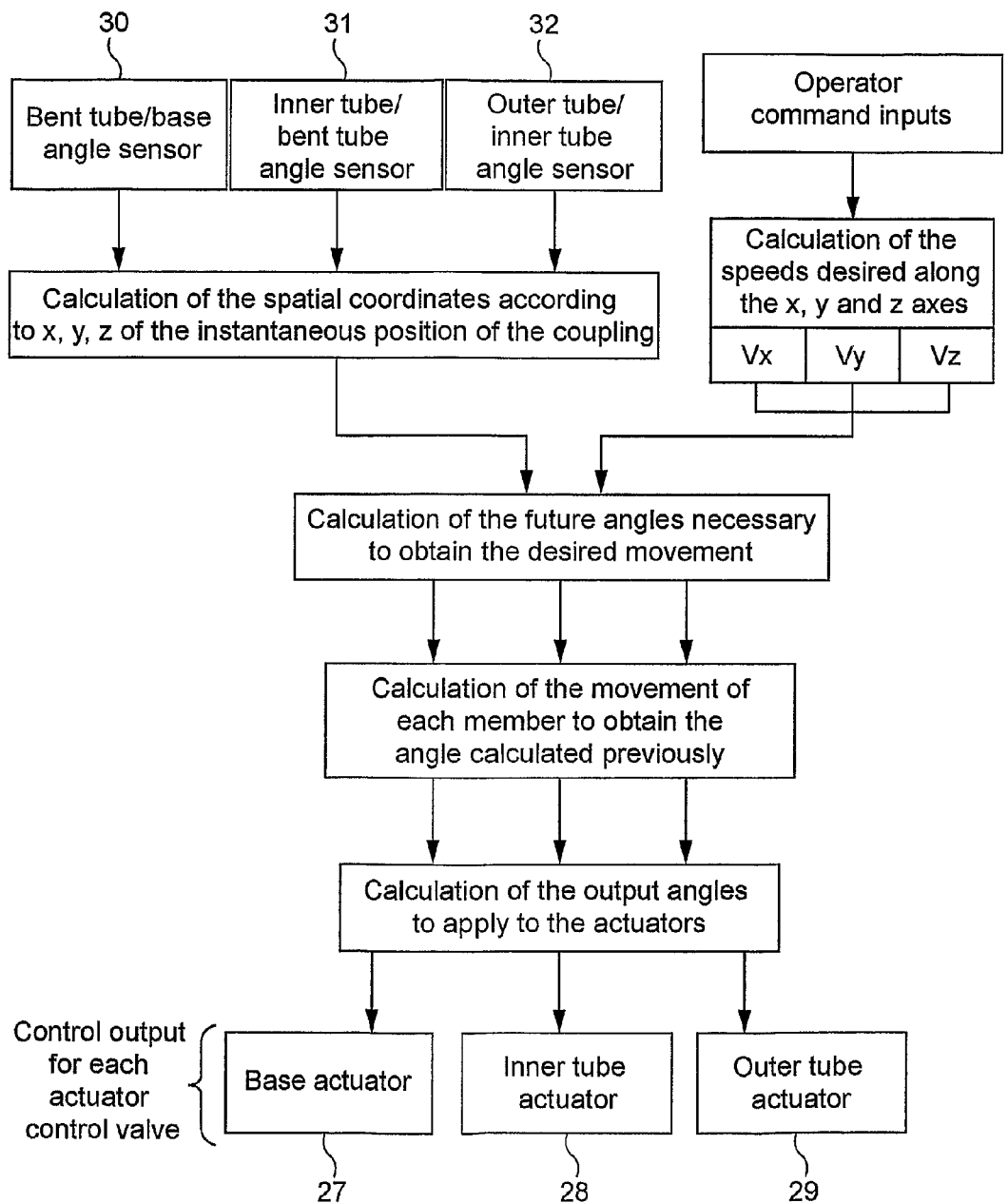
FIG. 3 is a function diagram to represent the principle of operation of the control device according to FIG. 2.

FIG. 3 presents, in a functional diagram, the principle of operation of the control device according to the invention, in particular according to FIGS. 1 and 2.

The three signals output by the angle sensors 30, 31, 32 disposed at each of the three articulations of the loading arm are sent to the automaton. On the basis of the angular data, the automaton calculates the spatial coordinates (according to the x, y and z axes) of the position of the coupling relative to a point of origin defined in advance.

In parallel, the automaton calculates, on the basis of the operator's command inputs made at the command interface (remote control unit) the Vx, Vy, and Vz speeds desired along the x, y and z axes.

On the basis of the spatial coordinates of the coupling position and the desired speeds, the automaton calculates the future angles necessary at the three articulations to obtain the movement desired by the user.

The automaton then calculates the movement to apply to each of the actuators 27, 28, 29 to obtain the angle already calculated, then it calculates the output instructions to apply to each of the actuators to control the movement of the loading arm in accordance with the command inputs by the operator.

In fact, the automaton calculates the spatial coordinates of the coupling 26 at any time and calculates the future angles necessary as soon as the command input interface 60 is acted upon by the user.

In a variant not illustrated, in a manner known per se, the control device according to the invention has a fourth actuator enabling the coupling to be clamped or unclamped.

Numerous other variants are possible according to circumstances, and in this connection it is to be noted that that the invention is not limited to the examples described and shown.

The invention claimed is:

1. A control device for the movement and positioning of a coupling for a marine loading system, said coupling being connectable to a target duct and said marine loading system comprising at least one fluid transfer line having a first line end fixed to a base and a moveable second line end on which the coupling is provided, the marine loading system further having a plurality of mechanical connections such that the coupling has at least three degrees of freedom relative to the base, the control device comprising:
   at least three proportional control actuators, each of which proportionally controls the movement of the system in a corresponding degree of freedom;
   at least three position sensors, each of which tracks the position of the system in a corresponding degree of freedom;
   an operator input interface for inputting movement commands to move the coupling; and
   a calculator for calculating the instantaneous position of the coupling from the information provided by the sensors, and for calculating, from the movement command inputs of the input interface, simultaneous control instructions to give to each of the actuators such that the combined movements of the actuators result in a movement of the coupling corresponding to the movement command provided by the operator at the input interface.

2. A device according to claim 1, wherein the input interface has at least one proportional control such that acting on said proportional control with higher or lower magnitude gives at least one proportional control instruction that is respectively of higher or lower magnitude for at least one of the actuators, resulting in a movement of the coupling at a speed of movement that is respectively higher or lower.

3. A device according to claim 1, wherein at least one of the position sensors is an angle sensor.

4. A device according to claim 1, wherein at least one of the proportional control actuators is a hydraulic actuator cooperating with a proportional control valve.

5. A device according to claim 1, wherein at least one of the proportional control actuators is a proportional control electric motor.

6. A device according to claim 1, wherein the input interface is connected to a transmitter having wireless communication with a receiver connected to the calculator such that communication between the input interface and the calculator is wireless.

7. A device according to claim 1, wherein the input interface has at least one manipulation member designed so as to supply movement commands to the coupling in at least two degrees of freedom.

8. A device according to claim 1, wherein the calculator is connected to a plurality of marine loading systems and a selector is provided at the input interface to allow the calculator to selectively control each of the loading systems.

9. An automaton for a control device for a marine loading system, the marine loading system including at least one fluid transfer line which comprises a first end that is fixed to a base and a second end that is movable in at least three degrees of freedom relative to the base, a coupling which is connected to the second end, at least three position sensors for tracking the position of the coupling in each degree of freedom, and at least three actuators for controlling movement of the coupling in each degree of freedom, the automaton comprising:

inputs for receiving a position signal from each position sensor and a control signal from an operator input interface by which an operator enters commands to move the coupling;

wherein the automaton is configured to calculate, on the basis of the inputs, simultaneous control instructions for each of the actuators such that the combined movements of the actuators result in a movement of the coupling corresponding to the movement command provided by the operator to the input interface;

the automaton further comprising outputs to which are connected to the actuators and through which the automaton applies the calculated control instructions to the actuators.

10. A calculating method for an automaton for a control device for a marine loading system, the marine loading system including at least one fluid transfer line which comprises a first end that is fixed to a base and a second end that is movable in at least three degrees of freedom relative to the base, a coupling which is connected to the second end, at least three position sensors for tracking the position of the coupling in each degree of freedom, and at least three actuators for controlling movement of the coupling in each degree of freedom, the calculating method comprising the following steps:

on the basis of information provided by the position sensors, calculating spatial coordinates of the coupling relative to a point of origin defined in advance;

on the basis of command inputs provided by an operator at a command interface, calculating desired speeds of movement in the at least three degrees of freedom of the coupling; and on the basis of the spatial coordinates of the coupling and of the desired speeds of movement, calculating output instructions to apply to each of the actuators to control the movement of the loading system according to the command inputs made at the command interface.

* * * * *